2,921,925

POLYEPOXIDE COMPOSITIONS

Benjamin Phillips and Paul S. Starcher, Charleston, and Charles W. McGary, Jr., and Charles T. Patrick, Jr., South Charleston, W. Va., assignors to Union Carbide Corporation, a corporation of New York No Drawing. Application December 20, 1956
Serial No. 629,476

32 Claims. (Cl. 260—75)

This invention relates to polyepoxide compositions and, more particularly, to polymerizable compositions and to resins made therefrom. It is directed to polymerizable compositions comprising bis(2,3-epoxycyclopentyl) ether and polycarboxylic acids and resins formed therefrom.

Our polymerizable compositions are low-viscosity, homogeneous liquids at room temperatures or at higher temperatures. These compositions can be easily handled in such resin-forming operations as coating, laminating, bonding, molding, casting, potting, calendering and the like. They are capable of accepting large amounts of solid materials, such as fillers and pigments, for providing various effects in physical properties and coloration without becoming highly viscous or hard to handle. With or without such added solid materials, they are easily pourable fluids which have the abilities of filling small intricacies of molds without the necessity of applying high pressures or heating to high temperatures, although such measures can be employed, if desired. Our compositions also can be easily spread, brushed, or sprayed by many techniques available in the paint, lacquer and varnish industries for making coatings and finishes. Little, if any shrinkage occurs in curing the resin. Our polymerizable compositions are capable of being accurately shaped by molds having intricate molding surfaces and cured to resins carrying exact details of such molding surfaces. They can also be advantageously employed in the potting of such fragile articles as electronic parts.

Our resins are transparent, water-resistant solids. They can be made as hard, rigid, thermoset products which are insoluble in most organic solvents, or they can be made as tough, flexible, thermoset products having negligible solubility in most organic solvents. The properties of our resins can be easily controlled as to degree of rigidity and flexibility such that resins having the properties needed to fit various requirements of rigidity or flexibility can be obtained. These resins can also be made free of the extreme discoloration without the employment of additional materials or process steps. These resins can be machined to desired shapes or configurations and can be polished to provide appealing finishes. They can also be made into articles having capabilities of sustaining loads at high temperatures. In accordance with our invention, resins having a combination of any or all of these useful properties can be produced.

Our polymerizable compositions can be advantageously made by mixing bis(2,3-epoxycyclopentyl) ether with a polycarboxylic acid. Bis(2,3-epoxycyclopentyl) ether is a liquid having a viscosity of about 28 centipoises at about 27° C. Homogeneous compositions with solid polycarboxylic acids can be obtained by heating the acid to at least its melting point and adding it to the ether, or by heating the ether and acid to at least the melting point of the acid. Stirring aids the formation of a homogeneous composition. Acidic catalysts in concentrations ranging up to about 5.0 weight percent based on the weight of bis(2,3-epoxycyclopentyl) ether can be added at this point, at any time before curing, or not at all, as desired. Higher catalyst concentrations are also effective, although concentrations of 5.0 weight percent and below have been found to be adequate. Catalyst concentrations of 0.001 to 5.0 weight percent based on the weight of bis(2,3-epoxycyclopentyl) ether are particularly preferred. This composition then can be cooled to room temperatures and stored for future use, if desired, or used immediately. Our polymerizable compositions can also contain polycarboxylic acid anhydrides which can be used to modify properties, such as, rigidity and hardness, of resins produced from such compositions. Polycarboxylic acid anhydrides are preferably added simultaneously with the polycarboxylic acids to bis(2,3-epoxycyclopentyl) ether or they can be added prior or subsequent to the addition of said acid. Homogeneous compositions may be obtained in the manner already described or in any other suitable manner. Other polyfunctional materials also may be incorporated into our polymerizable compositions. Such polyfunctional materials include polyhydric phenols, other polyepoxides, e.g., polyglycidyl ethers of polyhydric phenols and the like, low molecular weight urea-formaldehyde or phenol-formaldehyde polymers and the like. Many advantageous variations in the physical properties of our resins can be obtained by employing such other polyfunctional materials in our polymerizable compositions.

The curing can be carried out by maintaining the polymerizable compositions at temperatures from 50° C. to 250° C. Temperatures higher than 250° C. can be used, although some discoloration which may not be desired in the resin may result. The time for effecting a complete cure can be from several minutes to several hours. A high curing temperature provides resins in less time than a low curing temperature and the presence of a catalyst will also shorten the curing time. It is preferred, however, to heat the polymerizable composition at a temperature within the range of 50° C. to 150° C. to first effect a partial cure. A temperature from 100° C. to 200° C. then can be used to complete the cure. However, any one or combination of two or more temperatures within the above-specified range of 50° C. to 250° C. can be employed if desired, to effect the complete cure.

While not wishing to be held to any particular theory or mechanics of reaction, it is believed that in curing, one epoxy group of a bis(2,3-epoxycyclopentyl) ether molecule can be monofunctional when reacted with polycarboxylic acids, such that, one carboxy group of the acid reacts with a single epoxy group to form an ester linkage, i.e.,

interconnecting the acid molecule with the epoxide molecule and a hydroxyl group attached to said epoxide molecule. This reaction can be represented by the equation:

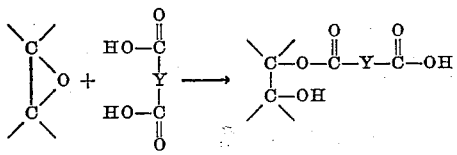

wherein

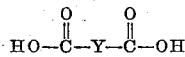

represents a polycarboxylic acid. A hydroxyl group such as that formed by this reaction and which is attached to the epoxide molecule is believed to be capable of reacting with an epoxy group, a carboxyl group or an oxydicarbonyl group of polycarboxylic acid anhydride to bring about cross-linking. Flexibilities of our resins have been found to be controllable through the selection and use in compositions from which they are made of various polycarboxylic acids having different numbers of carboxy groups and different numbers of atoms in chains connecting the carboxy groups. It has been found that our compositions containing polycarboxylic acids having more than two carboxy groups, for example, tend to form hard rigid resins and that compositions containing polycarboxylic acids having higher numbers of carboxy groups form harder and more rigid resins than those compositions containing polycarboxylic acids with lower numbers of carboxy groups. It has furthermore been found that our compositions which contain dicarboxylic acids having greater numbers of atoms in the shortest chains connecting the carboxy groups tend to form more flexible resins than those compositions which contain dicarboxylic acids with fewer atoms in the shortest chains connecting the carboxy groups. It is possible, therefore, through selection and use of polycarboxylic acids in our compositions to produce resins having properties to fit particular applications.

Similarly, it is believed that during curing, one epoxy group of a bis(2,3-epoxycyclopentyl) ether molecule can be difunctional when reacted with polycarboxylic acid anhydrides, such that, the equivalent of two carboxy groups of the anhydride reacts with a single epoxy group to form two ester linkages,

interconnecting the epoxide molecule with two anhydride molecules. This reaction can be typified by the general equation:

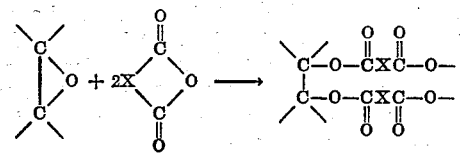

wherein

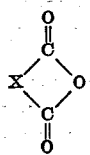

represents a polycarboxylic acid anhydride. This reaction of polycarboxylic acid anhydrides and bis(2,3-epoxycyclopentyl) ether is believed to provide cross-linking which increases the rigidity of resins formed from polymerizable compositions containing them. Additionally, some degree of cross-linking can be brought about by etherification of epoxy groups of different bis(2,3-epoxycyclopentyl) ether molecules as represented by the equation:

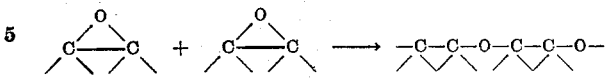

which is believed to occur during curing.

Our resins can be made as thermoset products having resistance to attack by many chemicals and which are water-resistant. As an illustration, these thermoset resins can be made from compositions containing bis(2,3-epoxycyclopentyl) ether, polycarboxylic acids in amounts having $y$ carboxy equivalents for each epoxy equivalent, and polycarboxylic acid anhydrides in amounts having $x$ carboxy equivalents for each epoxy equivalent, wherein $y$ is a number from 0.3 to 2.5, $x$ is a number from 0.1 to 0.5, the sum of $x$ and $y$ is not greater than 2.5 and the ratio of $x/y$ is less than one. By the term "carboxy equivalent," as used herein, with regard to polycarboxylic acid anhydrides, is meant the number of moles of carboxy groups, —COOH which would be contained by an amount of the hydrated anhydride or the polycarboxylic acid from which it can be derived, e.g., one mole of phthalic anhydride is considered to have 2 carboxy equivalents. When applied to polycarboxylic acids, the term "carboxy equivalent," as used herein, is meant to indicate the number of moles of carboxy groups, —COOH, contained by an amount of polycarboxylic acid, for example, one mole of a dicarboxylic acid contains 2 carboxy equivalents. By the term "epoxy equivalent," as used herein, is meant the number of moles of epoxy groups,

contained by an amount of bis(2,3-epoxycyclopentyl) ether. In determining the value of $x/y$ in the case where the denominator, $y$, may be zero, the quotient of $x/y$, as used herein, is taken to be equal to infinity or a number greater than one.

Resins which are hard, tough, thermoset products which resist the chemical action of organic solvents also can be made by our invention. Illustratively, our polymerizable compositions can be made from bis(2,3-epoxycyclopentyl) ether, polycarboxylic acids in amounts containing $y$ carboxy equivalents for each epoxy equivalent, and polycarboxylic acid anhydrides in amounts containing $x$ carboxy equivalents for each epoxy equivalent, wherein $y$ is a number from 0.5 to 1.25, $x$ is a number from 0.1 to 0.5, the sum of $x/y$ is not greater than 1.25 and the ratio of $x$ and $y$ is less than one. These polymerizable compositions can be cured to tough, hard, thermoset resins.

Our resins can be characterized as containing recurring interconnected groups of the formula:

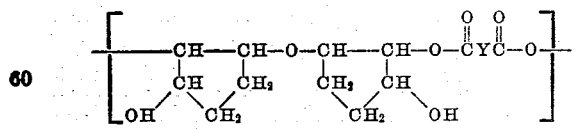

wherein Y is a polycarboxylic acid residue. By the term "polycarboxylic acid residue," as used herein, is meant a polyvalent group which can be regarded as the residue of a polycarboxylic acid molecule to which two or more carboxy groups, —COOH, are attached to constitute said polycarboxylic acid molecule. Thus, a dicarboxylic acid molecule consists of the divalent group or the dicarboxylic acid residue to which two carboxy groups are attached.

Bis(2,3-epoxycyclopentyl) ether is a liquid diepoxy dicyclic aliphatic ether having a viscosity of about 28 centipoises at 27° C. The preparation of this diepoxide involves what can be termed epoxidation, or the controlled oxidation of the double bonds of bis(2-cyclopentenyl) ether which, itself can be made from cyclopentadiene by the successive steps of hydrochlorination and alkaline hydrolysis. More specifically, a method for preparing bis(2-cyclopentenyl) ether is by the reaction of cyclopentadiene with hydrogen chloride in a suitable solvent, e.g., benzene, or without a solvent, for a period of about one hour at a low temperature, such as 0° C. to —15° C., thereby forming 1-chloro-2-cyclopentene. Subsequently, 1-chloro-2-cyclopentene can be subjected to alkaline hydrolysis with an aqueous solution of sodium carbonate or sodium hydroxide at a temperature of the order of 40° C. to 60° C. to form bis(2-cyclopentenyl) ether. A substantially pure bis(2-cyclopentenyl) ether then can be obtained by any suitable separation procedure, for example, fractional distillation.

Suitable epoxidizing agents for the epoxidation reaction include peracetic acid and acetaldehyde monoperacetate. The epoxidation reaction can be advantageously carried out by charging bis(2-cyclopentenyl)ether to a reaction vessel and then gradually adding the epoxidizing agent. In order to provide ease of handling and to avoid the formation of highly concentrated or crystalline peracetic acid with its attendant explosion hazard, the epoxidizing agent preferably is employed in a solvent, as for example, acetone, chloroform, methylethyl ketone, ethyl acetate, butyl acetate, and the like. The reaction can be carried out at a temperature within the range of about —25° C. to 150° C., although lower and higher temperatures may be used. However, longer reaction times are needed at the lower temperatures to produce high yields. At the higher temperatures, side reactions form undesirable materials which can be removed, however, by conventional purification procedures, such as, fractional distillation. The reaction is continued until an analysis for epoxidizing agent indicates that an amount at least sufficient to epoxidize all the double bonds of the bis(2-cyclopentenyl) ether has been consumed. In this connection it is desirable to employ an excess over the theoretical amount of peracetic acid to assure complete epoxidation. Upon discontinuance of the reaction, side-reaction products, solvent and unreacted material are removed by any convenient procedure, such as, by adding a potboiler, e.g., ethylbenzene, and stripping low-boiling materials. A liquid material, identified as bis(2,3-epoxycyclopentyl) ether, is obtained. This product partially solidifies on standing at room temperature for 1 to 3 days which indicates the possible formation of a solid position isomer. This semi-solid bis(2,3-epoxycyclopentyl) ether can be liquefied by melting at a temperature of 30° C. to 35° C. and will remain a liquid for a period of several days at room temperatures.

Polycarboxylic acids which can be used in our compositions are compounds containing two or more carboxy groups to the molecule. Typical polycarboxylic acids can be represented by the formula:

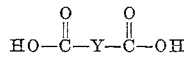

Y can represent a single bond or a divalent group composed of one carbon atom or groups of carbon atoms interconnected by single or multiple bonds, and to which such groups as hydrogen, alkyl, hydroxyl, carboxy, chloro, bromo, cyclic groups and the like or combinations thereof can be attached. Y can also represent a divalent group containing groups of carbon atoms interconnected by single or multiple bonds or ester linkages, i.e.,

or such other atoms as oxygen, sulfur or nitrogen atoms, interconnecting the carbon atom groups to which such other groups as previously mentioned may be attached. Y may represent cyclic groups, such as, phenylene, cyclohexylene, cyclohexenylene and the like. Polycarboxylic acids containing other groups not specifically mentioned herein and not participating in the curing reaction can be used in producing our polyesters and, in fact, can be particularly useful in developing special properties in our resins. Mixtures of polycarboxylic acids, or only one polycarboxylic acid, as desired, can be used in making our resins. Representative polycarboxylic acids include oxalic acid, malonic acid, succinic acid, glutaric acid, adipic acid, pimelic acid, suberic acid, azelaic acid, sebacic acid, alkylsuccinic acids, alkenylsuccinic acids, ethylbutenylsuccinic acid, maleic acid, fumaric acid, itaconic acid, citraconic acid, mesaconic acid, glutaconic acid, ethylidenemalonic acid, isopropylidenemalonic acid, allylmalonic acid, muconic acid, alpha-hydromuconic acid, beta-hydromuconic acid, diglycolic acid, dilactic acid, dithioglycolic acid, 4-amyl-2,5-heptadienedioic acid, 3-hexynedioic acid, 4,6-decadiynedioic acid, 2,4,6,8-decatetaenedioic acid, 1,2-cyclohexanedicarboxylic acid, 1,4-cyclohexanedicarboxylic acid, 2-carboxy-2-methylcyclohexaneacetic acid, phthalic acid, isophthalic acid, terephthalic acid, tetrahydrophthalic acid, tetrachlorphthalic acid, 1,8 - naphthalenedicarboxylic acid, 3-carboxycinnamic acid, 1,2 - naphthalenedicarboxylic acid, 1,1,5-pentanetricarboxylic acid, 1,2,4-hexanetricarboxylic acid, 2-propyl-1,2,4-pentanetricarboxylic acid, 5-octene-3,3,6-tricarboxylic acid, 1,2,3-propanetricarboxylic acid, 1,2,4-benzenetricarboxylic acid, 1,3,5-benzenetricarboxylic acid, 3-hexene-2,2,3,4-tetracarboxylic acid, 1,2,3,4-benzenetetracarboxylic acid, 1,2,3,5-benzenetetracarboxylic acid, 1,2,4,5-benzenetetracarboxylic acid, benzenepentacarboxylic acid, benzenehexacarboxylic acid and the like.

Also as polycarboxylic acids useful in our polymerizable compositions there are included compounds containing ester groups in addition to two or more carboxy groups and which can be aptly termed polycarboxy polyesters of polycarboxylic acids, such as those listed above, or the corresponding anhydrides of said acids, with polyhydric alcohols. Stated in other words, by the term "polycarboxy polyesters,") as used herein, is meant polyesters containing two or more carboxy groups per molecule. These polycarboxy polyesters can be prepared by known condensation procedures, employing mole ratios favoring greater than equivalent amounts of polycarboxylic acid, or anhydride. More specifically, the amount of polycarboxylic acid, or anhydride, employed in the esterification reaction should contain more carboxy groups than are required to react with the hydroxyl groups of the amount of polyhydric reactant. Polyhydric alcohols which can be employed in preparing these polycarboxy polyesters include dihydric alcohols, such as ethylene glycol, diethylene glycol, triethylene glycol, tetraethylene glycol, 1,2-propylene glycol, 1,3-propylene glycol, dipropylene glycols, tripropylene glycols, polyoxyethylene glycols, polyoxypropylene glycols, 1,2-butylene glycol, 1,4-butylene glycol, pentane-2,4-diol, 2,2-dimethyltrimethylene glycol, hexane-1,4-diol, hexane-1,5-diol, hexane-1,6-diol, hexane-2,5-diol, 3-methylpentane-1,5-diol, 2-methylpentane-2,5-diol, 3-methylpentane-2,5-diol, 2,2-diethylpopane-1,3-diol, 2-ethylhexane-1,3-diol, 2,5-dimethylhexane-2,5-diol, octadecane-1,12-diol, 1-butene-3,4-diol, 2-butene-1,4-diol, 2-butyne-1,4-diol, 2,5-dimethyl-3-hexyne-2,5-diol, and the like; trihydric compounds, such as glycerol, trimethylolmethane, hexane-1,2-6-triol, 1,1,1-trimethylolpropane, and the like; tetrahydric compounds, such as pentaerythritol, diglycerol, and the like; and higher polyhydric compounds such as pentaglycerol, dipentaerythritol, polyvinyl alcohols and the like. Additional polyhydric alcohols useful in making polycarboxy polyesters can be prepared by the reaction of epoxides, e. g., diglycidyl ethers of 2,2-propane bisphenol, and reactive hydrogen-containing organic compounds, e.g., polyfunctional amines, polycarboxylic acids, polyhydric alcohols and the like. In forming the polycarboxy polyesters that can be employed in the compositions of this invention it is preferable to use a dihydric, trihydric or tetrahydric aliphatic or oxaaliphatic alcohol. The mole ratios in which the polycarboxylic acid or anhydride can be reacted with polyhydric alcohols in preparing polycarboxylic polyesters useful in our compositions are those which provide polyesters having more than one carboxy group per molecule. In the case of trifunctional and tetrafunctional reactants in the esterification reaction, the mole ratios of the respective reactants must be such as to avert gelation. The preferred mole ratio ranges of dicarboxylic acid to trihydric or tetrahydric alcohols that have been found to provide polycarboxylic polyesters which preferably can be used in the compositions of this invention are presented in Table I.

TABLE I

| Polyhydric Alcohol | Mole Ratio of Dicarboxylic Acid or Anhydride to Polyhydric Alcohol |
| --- | --- |
| Trihydric Alcohol | 2.2 to 3.0. |
| Tetrahydric Alcohol | 3.3 to 4.0. |

It is particularly preferred, however, to employ polycarboxylic polyesters prepared from dicarboxylic acids or anhydrides and polyhydric alcohols in the mole ratios specified in Table II.

TABLE II

| Polyhydric Alcohol | Mole Ratio of Dicarboxylic Acid or Anhydride to Polyhydric Alcohol |
| --- | --- |
| Trihydric Alcohol | 2.5 to 3.0. |
| Tetrahydric Alcohol | 3.5 to 4.0. |

These polycarboxy polyesters can be obtained by condensing, in accordance with known procedures, a polyhydric alcohol and a polycarboxylic acid or anhydride. This condensation reaction may be conducted, for example, by heating the reactants to a temperature within the range from 100° C. to 300° C. with or without an acidic catalyst. Water formed by the condensation reaction may be removed by distillation. The course of the reaction may be followed by making acid number determinations and the reaction can be stopped when a suitable polycarboxy polyester has been obtained. As preferred polycarboxylic acids, those which are soluble in bis(2,3-epoxycyclopentyl) ether below about 250° C. are advantageously employed.

Polycarboxylic acid anhydrides useful in producing our resins can be represented by the formula:

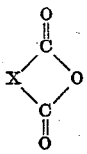

wherein X represents two or more carbon atoms interconnected by single or double bonds and to which such groups as hydrogen, alkyl, hydroxyl, nitro, chloro, iodo, bromo, cyclic, carboxyl groups and the like or combinations thereof may be attached. X can also represent groups containing carbon atoms interconnected by single or double bonds and oxydicarbonyl groups, i.e.

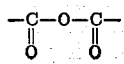

interconnecting the carbon atom groups to which other groups as previously mentioned may be attached. X may also represent such cyclic groups as phenylene, cyclohexylene, cyclohexenylene, and the like which may have one or more oxydicarbonyl groups attached thereto. Polycarboxylic acid anhydrides, containing other groups not specifically mentioned herein, and not taking part in the curing reaction may be used in our polymerizable compositions without harmful effects, and, in fact, may be used to develop particular properties in our resins. One polycarboxylic acid anhydride or a mixture of two or more, as desired, can be used in our polymerizable compositions. Typical polycarboxylic acid anhydrides include succinic anhydride, glutaric anhydride, propylsuccinic anhydride, methylbutylsuccinic anhydride, hexylsuccinic anhydride, heptylsuccinic anhydride, pentenylsuccinic anhydride, octenylsuccinic anhydride, nonenylsuccinic anhydride, alpha, beta-diethylsuccinic anhydride, maleic anhydride, chloromaleic anhydride, dichloromaleic anhydride, itaconic anhydride, citraconic anhydride, hexahydrophthalic anhydride, hexachlorphthalic anhydride, tetrahydrophthalic anhydride, methyltetrahydrophthalic anhydride, tetrachlorphthalic anhydride; hexachloroendomethylenetetrahydrophthalic anhydride, otherwise known as chlorendic anhydride, tetrabromophthalic anhydride, tetraiodophthalic anhydride; phthalic anhydride, 4-nitrophthalic anhydride, 1,2-naphthalic anhydride, 1,8-tetracarboxylic dianhydride; polymeric dicarboxylic acid anhydrides, or mixed polymeric dicarboxylic acid anhydrides such as those prepared by the autocondensation of dicarboxylic acids, for example, adipic acid, pimelic acid, sebacic acid, hexahydroisophthalic acid, terephthalic acid, isophthalic acid, and the like. Also, other dicarboxylic acid anhydrides, useful in our polymerizable compositions include the Diels-Alder adducts of maleic acid and aliphatic compounds having conjugated double bonds. Preferred polycarboxylic acid anhydrides are those which are soluble in bis(2,3-epoxycyclopentyl) ether at temperatures below about 250° C.

Catalysts which can be employed with advantageous effects in speeding the cure of our resins are the acidic catalysts including mineral acids and metal halide Lewis acids. Representative of mineral acids which can be used in aiding the cure of our resins include sulfuric acid, phosphoric acid, perchloric acid, polyphosphoric acid and the various sulfonic acids, such as, toluene sulfonic acid, benzene sulfonic acid and the like. Metal halide Lewis acids which are effective in speeding the cure of our resins include boron trifluoride, stannic chloride, zinc chloride, aluminum chloride, ferric chloride and the like. The metal halide Lewis acid catalysts can also be used in the form of such complexes as ether complexes and amine complexes, for example, boron trifluoride-piperidine and boron trifluoridemonoethylamine complexes. In the form of a complex, the metal halide Lewis acid catalyst is believed to remain substantially inactive until released as by dissociation of the complex upon increasing the temperature. When released from the complex, the catalyst then exerts its catalytic effect.

Uniform dispersion of catalyst in our polymerizable compositions prior to curing has been found to be desirable in order to obtain homogeneous resins and to minimize localized curing around catalyst particles. Agitation of the polymerizable compositions containing catalyst is adequate when the catalyst is miscible with said compositions. When the two are immiscible, the catalyst can be added in a solvent. Typical solvents for the catalysts include organic ethers, e.g., diethyl ether, dipropyl ether, 2-methoxy-1-propanol, organic esters, e.g., methyl acetate, ethyl acetate, ethylpropionate, organic ketones, e.g., acetone, methyl-isobutylketone, cyclohexanone, organic alcohols, e.g., methanol, cyclohexanol, propylene glycol and the like. The mineral acids can be employed as solutions in water, whereas metal halide Lewis acid catalysts tend to decompose in water and aqueous solutions of such Lewis acids are not preferred.

Our polymerizable compositions can be used in coatings, castings, moldings, bondings, laminates and the like in the manufacture of articles having a multitude of uses. These compositions can be colored by pigments and very appealing appearances may be imparted to articles made therefrom. Fillers can also be incorporated in our compositions so as to impart special properties to articles manufactured therefrom. For example, fibrous fillers, such as, glass fibers, or asbestos, can be added to improve tensile and impact strengths. Powdered fillers, such as, iron oxide and aluminum oxide can be also added to improve hardness and compressive strength. Such sundry articles as buttons, combs, brush handles, structural parts for instrument cabinets and the like can be formed through the use of our polymerizable compositions and resins. Our polymerizable compositions are particularly useful in the manufacture of large tools as for example used in the automobile industries wherein the fluid nature of our compositions simplifies the construction of such tools. These compositions are particularly useful in the potting of electrical components wherein it is desired to incorporate in the potting composition a heat conductive metal, such as, copper or aluminum.

The following examples are presented. In these examples, neutral equivalents wherever provided indicate the number of grams of polyester for each carboxy group contained by the polyester. Neutral equivalents provided herein were obtained by titrating a one gram sample of the polyester dissolved in acetone or ethanol with 0.5 N NaOH. Unless otherwise specified in the examples, room temperatures are temperatures within the range of 25° C. to 30° C.

*Examples 1 through 5*

Five mixtures, each containing 0.92 gram of bis(2,3-epoxycyclopentyl) ether and amounts of dicarboxylic acids correspondingly listed in Table I below were prepared. Each of these mixtures contained bis(2,3-epoxycyclopentyl) ether and acid in amounts providing 0.75 carboxy equivalent for each epoxy equivalent. The mixtures were heated until they became homogeneous (at a temperature below about 75° C. for Examples 1, 3, 4 and 5 and at a temperature of 100° C. to 110° C. for Example 2). The viscosities of these homogeneous mixtures at the above temperatures to which they were respectively brought to make them homogeneous were similar to the viscosity of water at room temperature. The mixture of Example 5 was a homogeneous liquid and the mixtures of Examples 1, 2, 3 and 4 were uniform pasty masses at room temperature. The mixtures were then brought to a temperature of 160° C. The temperature was maintained at 160° C. for about 6 hours during which time gels were formed. There was obtained from each of these mixtures a transparent, thermoset resin having the properties and Barcol hardnesses listed in Table I.

TABLE I

| Example Number | Dicarboxylic Acid | Weight of Acid (Grams) | Description of Resin | Barcol Hardness of Resin |
| --- | --- | --- | --- | --- |
| 1 | Glutaric | 0.46 | Light brown, tough | 18 |
| 2 | Adipic | 0.51 | ---do--- | 8 |
| 3 | Pimelic | 0.56 | ---do--- | 8 |
| 4 | Sebacic | 0.70 | ---do--- | 8 |
| 5 | Ethylbutenyl-succinic | 0.70 | Yellow | 20 |

*Examples 6 through 14*

Nine mixtures were prepared from bis(2,3-epoxycyclopentyl) ether and adipic acid. Each mixture contained 0.92 gram of bis(2,3-epoxycyclopentyl) ether and amounts of adipic acid correspondingly listed in Table II below. The ratios of carboxy equivalent per epoxy equivalent contained by each mixture is also correspondingly listed in Table II. Each mixture was heated until it became homogeneous (at a temperature of about 100° C. to 110° C.). At temperatures of 100° C. to 110° C. the viscosities of these homogeneous mixtures were similar to the viscosity of water at room temperature. All of these mixtures were uniform pasty masses at room temperature. Each mixture then was maintained at 160° C. until gels were formed. The times required to form gels from each mixture are correspondingly recorded in Table II. After the formation of gels the temperature was kept at 160° C. for an additional 6 hours. The mixtures of Examples 6 through 13 formed thermoset resins whereas the mixture of Example 14 did not solidify. The properties of the thermoset resins thus formed are listed in Table II.

TABLE II

| Example Number | Weight of Acid (Grams) | Carboxy Equivalent Per Epoxy Equivalent | Gel Time (Hours) | Description of Resin |
| --- | --- | --- | --- | --- |
| 6 | 0.22 | 0.3 | 7.12 | Light brown. |
| 7 | 0.37 | 0.5 | 2.07 | Light brown, tough. |
| 8 | 0.55 | 0.75 | 1.53 | Amber, tough. |
| 9 | 0.73 | 1.0 | 1.19 | Do. |
| 10 | 0.91 | 1.25 | 1.85 | Do. |
| 11 | 1.10 | | | |
| 12 | 1.46 | 2.0 | 5.5 | Yellow, opaque. |
| 13 | 1.83 | 2.5 | 6.17 | Do. |
| 14 | 2.19 | 3.0 | No gel | |

*Example 15*

A mixture containing 20 grams of bis(2,3-epoxycyclopentyl) ether, 10.5 grams of glutaric acid and 4.5 grams of glutaric anhydride was prepared. This mixture was heated until it became homogeneous. The mixture contained amounts of bis(2,3-epoxycyclopentyl) ether, acid and anhydride so as to provide 0.73 carboxy equivalent of acid and 0.36 carboxy equivalent of anhydride for each epoxy equivalent of ether. The mixture was brought to a temperature of about 60° C. to 75° C. to form a homogeneous mixture which at 60° C. to 75° C. had a viscosity similar to that of water at room temperature. The mixture was then poured into an aluminum mold and heated at 120° C. for 6 hours, during which time a gel was formed. The gel was then maintained at a temperature of 100° C. for an additional 6 hours. There was thus obtained a thermoset, solid resin having a heat distortion point of 58° C., Izod impact value of 0.2 foot pounds per inch of notch and a Barcol hardness of 19.

*Examples 16 through 22*

Polycarboxy polyesters having more than 1 carboxy group to the molecule were prepared by reacting dicarboxylic acids or anhydrides with polyhydric alcohols. The amount of dicarboxylic acid or anhydride reacted in each case was more than sufficient to react with the hydroxyl groups contained by the amounts of polyhydric alcohol so reacted. The number of moles and the specific acids or anhydrides and alcohols employed in each example are correspondingly listed in Table III below. The reactions of Examples 16, 17 and 19 through 21 were carried out by heating the listed proportions of acids or anhydrides and alcohols in a round-bottomed flask at 200° C. for periods of at least 30 minutes. The reaction of Example 18 was carried out at a temperature of 130° C. for 6 hours and the reaction of Example 22 was continued for 5½ additional hours at 200° C. In the reaction of Example 22 water formed as co-product was continuously removed during the reaction. The polycarboxy polyesters thereby produced varied from highly viscous liquids to straw colored solids having neutral equivalents, i.e., the number of gram equivalents of polyester per carboxy group, as listed in Table III.

TABLE III

| Example Number | Anhydride or Acid (Grams) | Moles of Acid or Anhydride | Polyhydric Alcohol | Moles of Alcohol | Neutral Equivalent of Product |
|---|---|---|---|---|---|
| 16 | Succinic anhydride (610 grams). | 6.1 | Glycerol (184 grams). | 2.0 | 121 |
| 17 | ----do---- | 6.1 | 1,2,6-Hexanetriol (268 grams). | 2.0 | 139 |
| 18 | Succinic anhydride (120 grams). | 1.2 | Pentaerythritol (34 grams). | 0.25 | 134 |
| 19 | Maleic anhydride (93 grams). | 0.95 | Ethylene glycol (31 grams). | 0.5 | 163 |
| 20 | Dichloromaleic anhydride (167 grams). | 1.0 | ----do---- | 0.5 | 198 |
| 21 | Phthalic anhydride (148 grams). | 1.0 | ----do---- | 0.5 | 216 |
| 22 | Adipic acid (146 grams.) | 1.0 | Glycerol (29 grams). | 0.32 | 159 |

Examples 23 through 29

Seven mixtures, each containing 0.92 gram of bis(2,3-epoxycyclopentyl) ether and a polycarboxy polyester made as described in Examples 16 through 22, were prepared. Each mixture contained the particular polyester of the respective examples as correspondingly listed in Table IV below. The amounts of respective polyesters are also correspondingly listed in Table IV. Each mixture comprised amounts of bis(2,3-epoxycyclopentyl) ether and polyester so as to provide 0.7 carboxy equivalent per epoxy equivalent. The mixtures were heated until they became homogeneous (at temperatures of about 100° C. to 110° C.). These mixtures at temperatures from 100° C. to 110° C. had viscosities which were similar to the viscosity of water at room temperature. The temperature of each mixture was then raised to 160° C. and gels were formed in the times correspondingly listed in Table IV. After the formation of gels the temperature was maintained at 160° C. for an additional 6 hours. Each mixture formed a thermoset, solid resin having the properties and Barcol hardnesses correspondingly listed in Table IV.

TABLE IV

| Example Number | Polyester of Example Number | Weight of Polyester (Grams) | Gel Time (Minutes) | Description of Resin | Barcol Hardness |
|---|---|---|---|---|---|
| 23 | 16 | 0.87 | 27 | Amber, tough | 32 |
| 24 | 17 | 0.98 | 28 | ----do---- | 18 |
| 25 | 18 | 0.94 | 26 | ----do---- | 31 |
| 26 | 19 | 0.91 | 15 | Colorless, tough | 32 |
| 27 | 20 | 1.11 | 80 | Amber | 0 |
| 28 | 21 | 1.38 | 4 | Light brown | |
| 29 | 22 | 1.5 | 48 | Amber | |

Example 30

A mixture comprising 15 grams of bis(2,3-epoxycyclopentyl) ether and 15 grams of a polycarboxy polyester made from succinic anhydride and glycerol as described in Example 16 was prepared. The amounts of bis(2,3-epoxycyclopentyl) ether and polyester of this mixture provided 0.75 carboxy equivalent for each epoxy equivalent. The mixture was heated until it became homogeneous (at a temperature of about 90° C. to 100° C.) and poured into an aluminum mold. At a temperature of 90° C. to 100° C. this homogeneous mixture had a viscosity which was similar to that of water at room temperature. The temperature of the mixture was brought to 160° C. and a gel formed after 3 minutes at this temperature. The gel was maintained at 160° C. for an additional 6 hours. A thermoset resin having a heat distortion point of 57° C., an Izod impact of 0.4 foot pounds per inch of notch and a Barcol hardness of 30 was obtained.

Barcol hardness values given in the foregoing examples were obtained by the use of a Barcol Impressor GYZJ 934-1. Heat distortion values and Izod impact values were obtained in accordance with ASTM methods D-648-45T and D-256-47T, respectively.

What is claimed is:

1. A polymerizable composition comprising bis(2,3-epoxycyclopentyl) ether, a polycarboxylic acid in an amount having $y$ carboxy equivalents for each epoxy equivalent of said composition and a polycarboxylic acid anhydride in an amount having $x$ carboxy equivalent for each epoxy equivalent of said composition; wherein $y$ is a number from 0.3 to 2.5, $x$ is a number from 0.1 to 0.5, the sum of $x$ and $y$ is not greater than 2.5 and $x/y$ is less than one.

2. A polymerizable composition comprising bis(2,3-epoxycyclopentyl) ether, a polycarboxylic acid in an amount having $y$ carboxy equivalents for each epoxy equivalent of said composition and a polycarboxylic acid anhydride in an amount having $x$ carboxy equivalent for each epoxy equivalent of said composition; wherein $y$ is a number from 0.5 to 1.25, $x$ is a number from 0.1 to 0.5, the sum of $x$ and $y$ is not greater than 1.25 and $x/y$ is less than one.

3. A polymerizable composition comprising bis(2,3-epoxycyclopentyl) ether, a dicarboxylic acid in an amount having $y$ carboxy equivalents for each epoxy equivalent of said composition and a dicarboxylic acid anhydride in an amount having $x$ carboxy equivalent for each epoxy equivalent of said composition; wherein $y$ is a number from 0.3 to 2.5, $x$ is a number from 0.1 to 0.5, the sum of $x$ and $y$ is not greater than 2.5 and $x/y$ is less than one.

4. A polymerizable composition comprising bis(2,3-epoxycyclopentyl) ether and glutaric acid in an amount having from 0.3 to 2.5 carboxy equivalents for each epoxy equivalent of bis(2,3-epoxycyclopentyl) ether.

5. A polymerizable composition comprising bis(2,3-epoxycyclopentyl) ether and adipic acid in an amount having from 0.3 to 2.5 carboxy equivalents for each epoxy equivalent of bis(2,3-epoxycyclopentyl) ether.

6. A polymerizable composition comprising bis(2,3-epoxycyclopentyl) ether and pimelic acid in an amount having from 0.3 to 2.5 carboxy equivalents for each epoxy equivalent of bis(2,3-epoxycyclopentyl) ether.

7. A polymerizable composition comprising bis(2,3-epoxycyclopentyl) ether and sebacic acid in an amount having from 0.3 to 2.5 carboxyl equivalents for each epoxy equivalent of bis(2,3-epoxycyclopentyl) ether.

8. A polymerizable composition comprising bis(2,3-epoxycyclopentyl) ether and ethylbutenylsuccinic acid in an amount having from 0.3 to 2.5 carboxy equivalents for each epoxy equivalent of bis(2,3-epoxycyclopentyl) ether.

9. A polymerizable composition comprising bis(2,3-epoxycyclopentyl) ether and a glycerol-succinic anhydride polycarboxy polyester in an amount having from 0.5 to 1.25 carboxy equivalents per epoxy equivalent of bis(2,3-epoxycyclopentyl) ether.

10. A polymerizable composition comprising bis(2,3-epoxycyclopentyl) ether and a 1,2,6-hexanetriol-succinic anhydride polycarboxy polyester in an amount having from 0.5 to 1.25 carboxy equivalents per epoxy equivalent of bis(2,3-epoxycyclopentyl) ether.

11. A polymerizable composition comprising bis(2,3-epoxycyclopentyl) ether and a pentaerythritol-succinic anhydride polycarboxy polyester in an amount having from 0.5 to 1.25 carboxy equivalents per epoxy equivalent of bis(2,3-epoxycyclopentyl) ether.

12. A polymerizable composition comprising bis(2,3-epoxycyclopentyl) ether and an ethyleneglycol-dichloromaleic anhydride polycarboxy polyester in an amount having from 0.5 to 1.25 carboxy equivalents per epoxy equivalent of bis(2,3-epoxycyclopentyl) ether.

13. A polymerizable composition comprising bis(2,3-epoxycyclopentyl) ether and an ethyleneglycol-phthalic anhydride polycarboxy polyester in an amount having from 0.5 to 1.25 carboxy equivalents per epoxy equivalent of bis(2,3-epoxycyclopentyl) ether.

14. A polymerizable composition comprising bis(2,3-epoxycyclopentyl) ether, glutaric acid in an amount having $y$ carboxy equivalents for each epoxy equivalent of bis(2,3-epoxycyclopentyl) ether and glutaric anhydride having $x$ carboxy equivalents for each epoxy equivalent of bis(2,3-epoxycyclopentyl) ether, wherein $y$ is a number from 0.3 to 2.5, $x$ is a number from 0.1 to 0.5, the sum of $x$ and $y$ is not greater than 2.5 and $x/y$ is less than one.

15. A polymerizable composition comprising bis(2,3-epoxycyclopentyl) ether and glutaric acid in an amount having 0.75 carboxy equivalent for each epoxy equivalent of bis(2,3-epoxycyclopentyl) ether.

16. The resinous polymer obtained by heating the polymerizable composition of claim 1.

17. The resinous polymer obtained by heating the polymerizable composition of claim 2.

18. The resinous polymer obtained by heating the polymerizable composition of claim 3.

19. The resinous polymer obtained by heating the polymerizable composition of claim 4.

20. The resinous polymer obtained by heating the polymerizable composition of claim 5.

21. The resinous polymer obtained by heating the polymerizable composition of claim 6.

22. The resinous polymer obtained by heating the polymerizable composition of claim 7.

23. The resinous polymer obtained by heating the polymerizable composition of claim 8.

24. The resinous polymer obtained by heating the polymerizable composition of claim 9.

25. The resinous polymer obtained by heating the polymerizable composition of claim 10.

26. The resinous polymer obtained by heating the polymerizable composition of claim 11.

27. The resinous polymer obtained by heating the polymerizable composition of claim 12.

28. The resinous polymer obtained by heating the polymerizable composition of claim 13.

29. The resinous polymer obtained by heating the polymerizable composition of claim 14.

30. The resinous polymer obtained by heating the polymerizable composition of claim 15.

31. A polymerizable composition comprising bis(2,3-epoxycyclopentyl) ether and a polycarboxylic acid in an amount having from 0.3 to 2.5 carboxy equivalents per epoxy equivalent of bis(2,3-epoxycyclopentyl) ether.

32. A resinous polymer obtained by heating the polymerizable composition of claim 30.

References Cited in the file of this patent

UNITED STATES PATENTS

| | | |
|---|---|---|
| 2,735,829 | Wiles et al. | Feb. 21, 1956 |
| 2,739,161 | Carlson | Mar. 20, 1956 |
| 2,744,845 | Rudoff | May 8, 1956 |

FOREIGN PATENTS

| | | |
|---|---|---|
| 133,819 | Australia | July 14, 1946 |

UNITED STATES PATENT OFFICE
CERTIFICATE OF CORRECTION

Patent No. 2,921,925                  January 19, 1960

Benjamin Phillips et al.

It is hereby certified that error appears in the printed specification of the above numbered patent requiring correction and that the said Letters Patent should read as corrected below.

Column 6, line 18, for "tetaenedioic" read --tetraenedioic --; line 24, for "1,2,4-hexaneticarboxylic" read -- 1,2,4-hexanetricarboxylic --; line 39, for "polyesters,") as" read -- polyesters," as --; line 59, for "2,2-diethylpopane-1,3-diol" read -- 2,2-diethylpropane-1,3-diol --; column 7, line 45, for "300° C." read -- 200° C. --; column 12, line 49, for "carboxyl" read -- carboxy --; column 14, line 22, for the claim reference numeral "30" read -- 31 --.

Signed and sealed this 5th day of July 1960.

(SEAL)
Attest:

KARL H. AXLINE
Attesting Officer

ROBERT C. WATSON
Commissioner of Patents